United States Patent
Zheng et al.

(10) Patent No.: US 9,328,241 B2
(45) Date of Patent: May 3, 2016

(54) THERMOPLASTIC POLYIMIDE AS FLOW PROMOTER AND FLAME RETARDANT SYNERGIST FOR FILLED POLYAMIDE COMPOSITIONS

(75) Inventors: Yun Zheng, Shanghai (CN); Shijie Song, Shanghai (CN); Anirban Ganguly, Karnataka (IN); Yuxian An, Shanghai (CN)

(73) Assignee: SABIC Global Technologies B.V., Bergen op Zoom (NL)

( * ) Notice: Subject to any disclaimer, the term of this patent is extended or adjusted under 35 U.S.C. 154(b) by 186 days.

(21) Appl. No.: 13/612,399

(22) Filed: Sep. 12, 2012

(65) Prior Publication Data

US 2014/0073724 A1 Mar. 13, 2014

(51) Int. Cl.
*C08K 7/14* (2006.01)
*C08L 77/00* (2006.01)
*C08L 77/06* (2006.01)
*C08G 69/36* (2006.01)
*C08G 73/10* (2006.01)

(52) U.S. Cl.
CPC .............. *C08L 77/00* (2013.01); *C08G 69/36* (2013.01); *C08G 73/1046* (2013.01); *C08L 77/06* (2013.01); *C08L 2205/02* (2013.01)

(58) Field of Classification Search
CPC ........... C08K 7/14; C08L 77/00; C08L 77/06; C08L 79/08
USPC .......... 524/100, 122, 126, 133, 494, 495, 496
See application file for complete search history.

(56) References Cited

U.S. PATENT DOCUMENTS

| | | | |
|---|---|---|---|
| 6,822,032 B2 | 11/2004 | Gallucci | |
| 7,294,661 B2 | 11/2007 | Martens et al. | |
| 2006/0058432 A1* | 3/2006 | Perego et al. | 524/115 |
| 2006/0189747 A1 | 8/2006 | Joachimi et al. | |
| 2009/0068432 A1 | 3/2009 | Gallucci et al. | |
| 2010/0249292 A1 | 9/2010 | Saga et al. | |
| 2012/0302677 A1 | 11/2012 | Cristadoro et al. | |

FOREIGN PATENT DOCUMENTS

| | | |
|---|---|---|
| EP | 1445284 | 8/2004 |
| WO | WO-02102899 | 12/2002 |
| WO | WO-2005118698 | 12/2005 |

OTHER PUBLICATIONS

International Search Report issued Jan. 8, 2014 by the International Searching Authority for PCT Application PCT/IB2013/058465 filed Sep. 11, 2013 which published as WO 2014/041494 (Inventor—Yun Zheng, et al. // Applicant—SABIC Innovative Plastics IP, B.V.) (5 pages).

Written Opinion issued Jan. 8, 2014 by the International Searching Authority for PCT Application PCT/IB2013/058465 filed Sep. 11, 2013 which published as WO 2014/041494 (Inventor—Yun Zheng, et al. // Applicant—SABIC Innovative Plastics IP, B.V.) (6 pages).

* cited by examiner

*Primary Examiner* — Edward Cain
(74) *Attorney, Agent, or Firm* — Baker Hostetler LLP

(57) ABSTRACT

Disclosed herein are compositions comprising polyamides, thermoplastic polyimides, and inorganic fillers. The compositions can also comprise a flame retardant additive. Also disclosed are materials and devices made thereof. This abstract is intended as a scanning tool for purposes of searching in the particular art and is not intended to be limiting of the present invention.

19 Claims, 5 Drawing Sheets

THERMOPLASTIC POLYIMIDE AS FLOW PROMOTER AND FLAME RETARDANT SYNERGIST FOR FILLED POLYAMIDE COMPOSITIONS

FIELD OF INVENTION

The present disclosure relates to compositions comprising polyamides, thermoplastic polyimides, such as polyetherimides, and inorganic fillers, and articles of manufacture made therefrom.

BACKGROUND

Polymers, like polycarbonate, polyamide, polyester, etc., when combined with glass fiber and flame retardant additives, can achieve high modulus, and good flame retardancy, and can be used in various applications, such as replacement materials for metals in personal computers (notebooks) in order to achieve light weight and reduce cost. For notebooks or laptops to become ever thinner and lighter, strong materials with robust flame retardancy and better flow ability are needed. To meet both high modulus and good flame retardancy, more reinforcing filler and flame retardant additives are needed, which generally will drop the flow ability and ductility. Therefore, it is difficult to balance the flow, ductility, stiffness, and flame retardant performance of the materials, so they are suitable for the desired applications.

Currently, semi-crystalline polymers, such as some polyamides, also called nylon, are more attractive than amorphous polymers, such as polycarbonate, for metal replacement as materials for computers parts due to their stiffness properties. However, some polyamides, such as polyamide 66 and polyamide 6, possess some undesired properties, such as high moisture uptake, warpage issue and some other shortcomings, for this type of application. High temperature polyamides or semi-aromatic polyamides show better performance in terms of anti-moisture and warpage control than polyamide 66 and polyamide 6. However, compositions with polyamide possess undesired flow properties, especially when incorporating high loadings of inorganic filler and flame retardants to increase stiffness and flame retardancy. At the same time, as laptop and notebook designs becomes slimmer it requires thinner and thinner parts. For example, parts having a thickness of 1.8 mm to 2.5 mm, 1.2 mm to 1.6 mm, >1.0 mm, and even 0.6 mm to 0.8 mm are desired. To meet these requirements, new and more effective method/components are needed to improve flow properties and flame retardancy of the materials for these application. A generally method to improve the flow property of polyamide is to reduce aromatic group percentage by copolymerization or blends with aliphatic polyamides. However, this method reduces flame retardancy, thermal stability, and causes issue relating to dimensional stability and moisture absorption etc.

Thus, there is a need for materials with the desired properties discussed above. Such compositions, materials and articles of manufacture with the compositions are disclosed herein.

SUMMARY

In accordance with the purpose(s) of the invention, as embodied and broadly described herein, this disclosure, in one aspect, relates to compositions comprising polyamides, thermoplastic polyimides, such as polyetherimides (PEI), and inorganic fillers. Also disclosed are articles of manufacture comprising the disclosed compositions.

Disclosed herein are compositions comprising thermoplastic polyimide, such as polyetherimide, and polyamide. PEI is an amorphous polymer with higher processing temperature and higher viscosity compared to polyamide. As disclosed herein, a composition comprising PEI and polyamide effectively lowers the viscosity of the composition compared to only polyamide. As a result, such composition has better flow property and also possesses a flame retardant synergy effect with certain combination of other flame retardant additives. In one aspect, a composition comprising polyamide and PEI is obtained through twin-screw compounding. Such compositions have a well-balanced stiffness, improved flow properties, robust flame retardancy while retaining other mechanical properties. The compositions also exhibit synergistic properties as it relates to flame retardancy.

Also disclosed herein is a composition comprising: about 30% to about 99.5% by weight polyamide; above 0% to about 20% by weight thermoplastic polyimide, such as polyetherimide; and above 0% to about 60% by weight inorganic filler. In one aspect the composition further comprises above 0% to about 20% by weight flame retardant additive Also disclosed are methods of making the described compositions and articles of manufacture comprising the described compositions.

BRIEF DESCRIPTION OF THE FIGURES

The accompanying figures, which are incorporated in and constitute a part of this specification, illustrate several aspects and together with the description serve to explain the principles of the invention.

Figure 1:
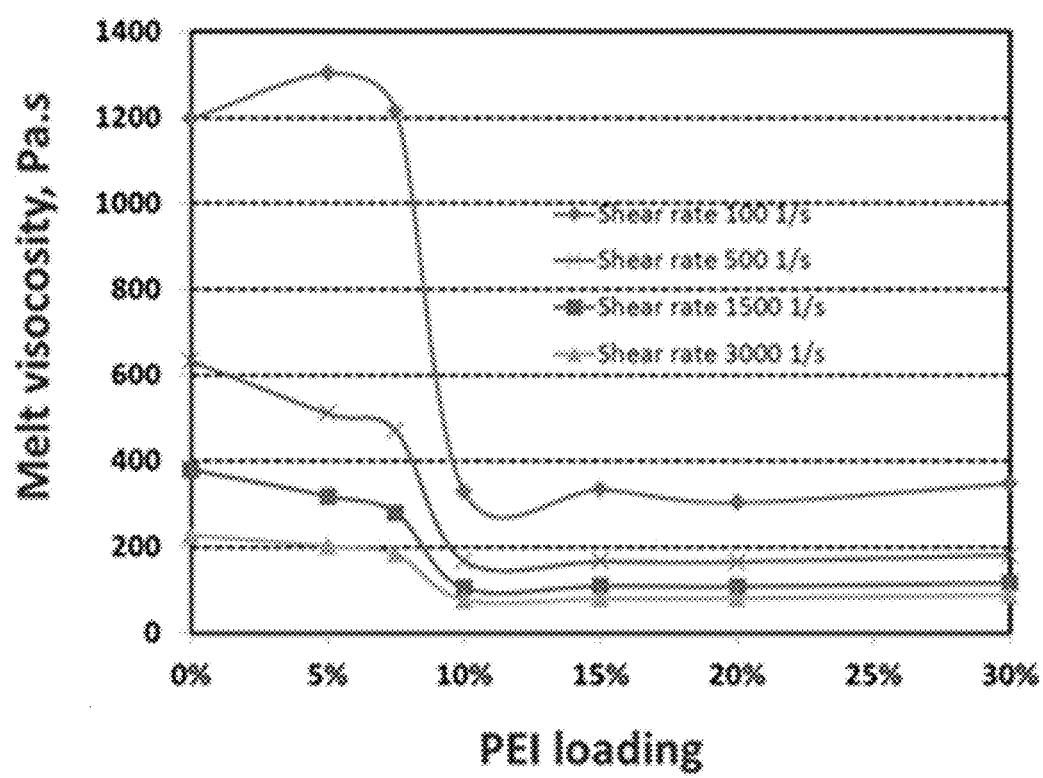
FIG. 1 shows the influence of PEI on melting viscosity of glass fiber filled PPA compositions at different shear rates.
Figure 2:
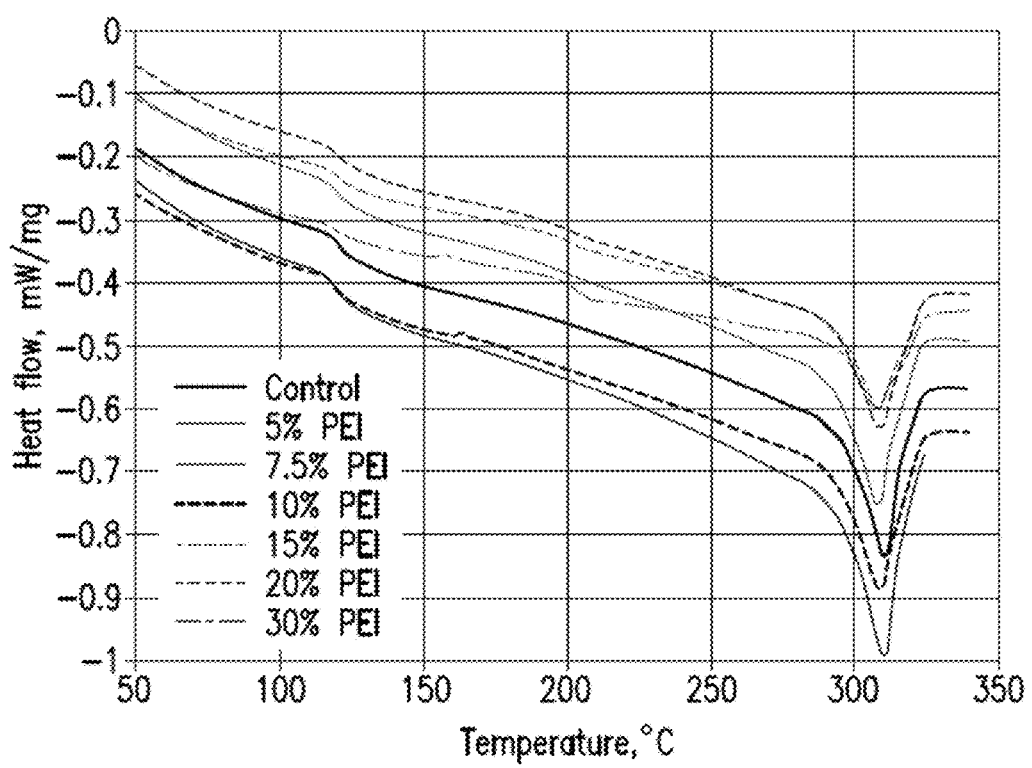
FIG. 2 shows the DSC curve of 40% glass fiber filled PPA with PEI loading from 0-40%.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

A. DEFINITIONS

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a nanocomposite" includes mixtures of two or more nanocomposites, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or cannot occur, and that the description includes instances where said event or circumstance occurs and instances where it does not.

As used herein, the term "effective amount" refers to an amount that is sufficient to achieve the desired modification of a physical property of the composition or material. For example, an "effective amount" of a flame retardant additive refers to an amount that is sufficient to achieve the desired property associated with the flame retardant additive and the like. The specific level in terms of wt % in a composition required as an effective amount will depend upon a variety of factors including the amount and type of flame retardant additive, amount and type of thermoplastic polyimide, and polyamide.

As used herein, the term "about X %" or the like terms refer to ±0.5% within the value of X. For example, about 10% refers to 9.5%-10.5%.

As used herein, the term "composition without the polyetherimide" or the like terms refer to a composition that is identical to another composition but for the exclusion of polyetherimide. For example, if a composition contains polyamide, filler, polyetherimide, and a flame retardant additive, then a composition without the polyetherimide contains polyamide, filler, and a flame retardant additive.

As used herein, the term "flame retardant additive" or the like terms refer to a material that prevent, delay, or inhibit spreading of fire. Incorporating a flame retardant additive in plastics can reduce the flammability. Typical examples of flame retardant additives include, but are not limited to, phosphinates, condensation products of melamine and/or reaction products of melamine with phosphoric acid and/or reaction products of condensation products of melamine with phosphoric, and phosphazene compounds. Each flame retardant additive can be used independently, or can be used in combination with other flame retardant additives. As used herein, phosphinates comprising a phosphinate of the formula (XI) and/or a diphosphinate of the formula (XII) and/or polymers of there

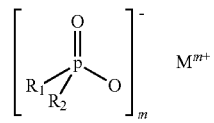

(XI)

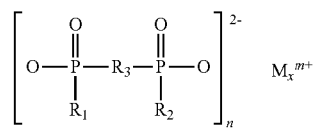

(XII)

wherein $R_1$ and $R_2$ are identical or different and are independently C1-C6 alkyl, linear, or branched, and/or aryl; $R_3$ is C1-C10-alkylene, linear, or branched, $C_6$-$C_{10}$-arylene, -alkylarylene or-arylalkylene; M can be calcium ions, magnesium ions, aluminum ions and/or zinc ions; m can be 2 to 3; n can be 1 or 3; and x can be 1 or 2; and optionally comprising, $R_1$ and $R_2$ can be identical or different and are preferably methyl, ethyl, n-propyl, isopropyl, n-butyl, tert-butyl, n-pentyl and/or phenyl. In one aspect, $R_3$ can be methylene, ethylene, n-propylene, isopropylene, n-butylene, tert-butylene, n-pentylene, n-octylene, n-dodecylene, or phenylene or naphthylene, or methylphenylene, ethylphenylene, tert-butylphenylene, methylnaphthylene, ethylnaphthylene or tert-butylnaphthylene, or phenylmethylene, phenylethylene, phenylpropylene or phenylbutylene. For example, M can be aluminum ions or zinc ions.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

B. COMPOSITIONS

Disclosed herein is a composition comprising: about 20% to about 99.5% by weight polyamide; above 0% to about 20% by weight thermoplastic polyimide, such as polyetherimide; and above 0% to about 60% by weight inorganic filler. In one aspect the composition further comprises above 0% to about 20% by weight of at least one flame retardant additive.

1. Polyamides

In one aspect, the polyamide can be present in an amount of about 30%, 35%, 40%, 45%, 50%, 55%, 60%, 65%, 70%, 75%, 80%, 85%, 90%, or 95% by weight. For example, the polyamide can be present in at least 45%. In another aspect, the polyamide can be present in an amount of at least about 20% to about 90% by weight of the composition. For example, the polyamide can be present in an amount of at least about 20% to about 70% by weight of the composition.

In one aspect, the polyamide can be selected from the group consisting of aromatic polyamide and semi-aromatic polyamide, or a mixture thereof. For example, the polyamide can be a semi-aromatic polyamide. Suitable semi-aromatic polyamides include, but are not limited to polyphthalamide (PPA), such as PA6T, PA6I, PA6-6IT, PA6M-T, PAST, PA 10T, PA11T, PMXD6 and copolymers and mixtures thereof. Other suitable polyamides include, but are not limited to PA6, PA66, PA46, PA610, PA612, PA11, PA1010, PA12 or a combination thereof.

In one aspect, the polyamide is a thermoplastic. In another aspect, the polyamides can have an inherent viscosity of about 0.75 dl/g to about 3.0 dl/g.

2. Thermoplastic Polyimide

As used herein, thermoplastic polyimides have the general formula (I)

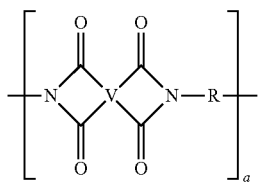

wherein a is greater than or equal to about 10 in one embodiment, and greater than or equal to about 1000 in an alternative embodiment; and wherein V is a tetravalent linker without limitation, as long as the linker does not impede synthesis or use of the polyimide. Suitable linkers include (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms; or combinations thereof. Suitable substitutions and/or linkers include, but are not limited to, ethers, epoxides, amides, esters, and combinations thereof. In select embodiments the linkers include, but are not limited to, tetravalent aromatic radicals of formula (II), such as

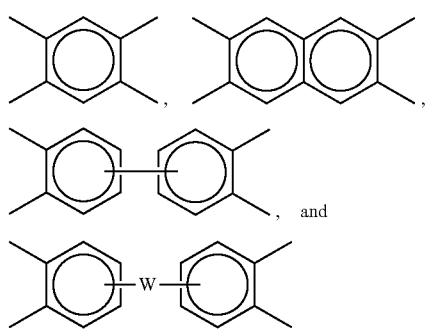

wherein W is a divalent moiety selected from the group consisting of —O—, —S—, —C(O)—, —SO$_2$—, —SO—, —C$_y$H$_{2y}$— (y being an integer from 1 to 5), and halogenated derivatives thereof, including perfluoroalkylene groups, or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula (III).

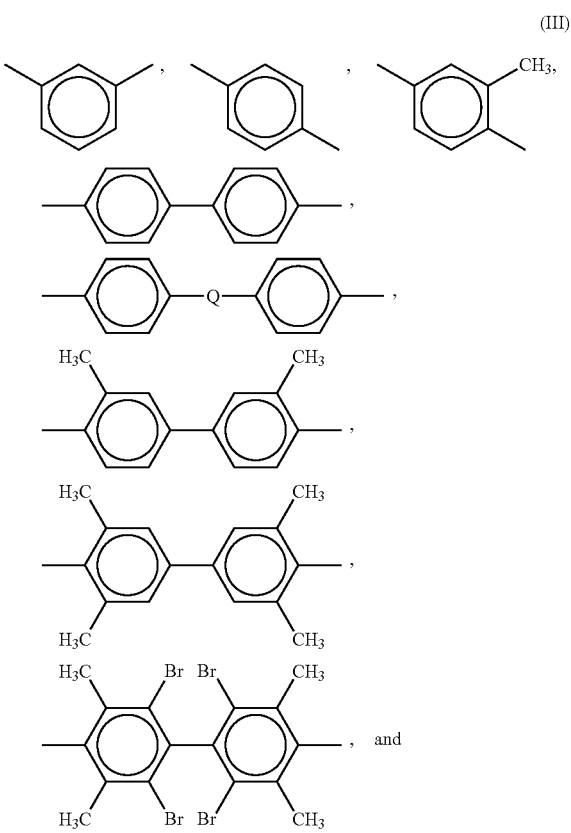

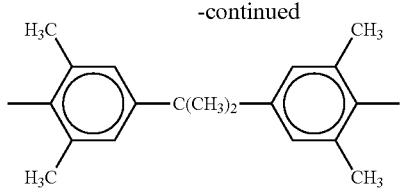

wherein Q includes a divalent moiety selected from the group consisting of —O—, —S—, —C(O)—, —SO$_2$—, —SO—, —C$_y$H$_{2y}$- (y being an integer from 1 to 5), and halogenated derivatives thereof, including perfluoroalkylene groups.

In one aspect, polyimides used in the disclosed compositions include polyamidimides, polyetherimides (PEI) and polybenzimidazoles. For example, the thermoplastic polyimides can be PEI.

As used herein, the PEI polymers include more than 1 structural unit of the formula (IV), with alternative embodiments including about 10 to about 1000 or more, and other alternative embodiments including about 10 to about 500 structural units, of the formula (IV)

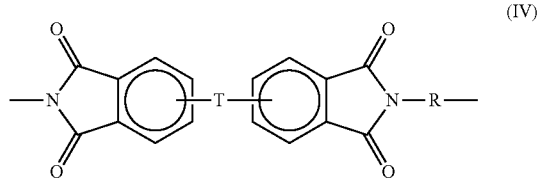

wherein T is —O— or a group of the formula —O—Z—O— wherein the divalent bonds of the —O— or the —O—Z—O— group are in the 3,3', 3,4', 4,3', or the 4,4' positions, and wherein Z includes, but is not limited to, divalent radicals of formula (III) as defined above.

In a further aspect, the PEI polymer can be a copolymer, which, in addition to the etherimide units described above, further contains polyimide structural units of the formula (V)

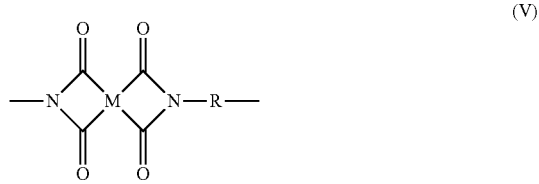

wherein R is as previously defined for formula (I) and M includes, but is not limited to, radicals of formula (VI):

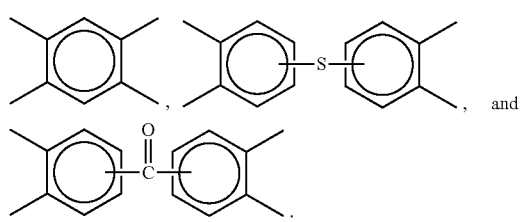

The polyetherimide can be prepared by any of the methods including the reaction of an aromatic bis(ether anhydride) of the formula (VII)

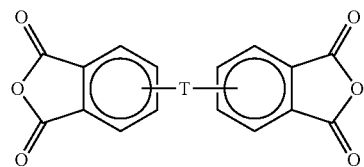

with an organic diamine of the formula (VIII)

wherein T and R are defined as described above in formulas (I) and (IV).

Illustrative examples of aromatic bis(ether anhydride)s of formula (VII) include 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent. A useful class of aromatic bis(ether anhydride)s included by formula (VII) above includes, but is not limited to, compounds wherein T is of the formula (IX)

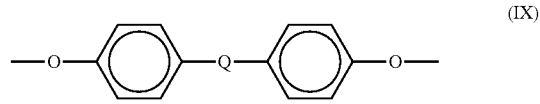

and the ether linkages, for example, are beneficially in the 3,3', 3,4', 4,3', or 4,4' positions, and mixtures thereof, and where Q is as defined above.

Any diamino compound may be employed in the preparation of the polyimides and/or polyetherimides. Examples of suitable compounds are ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy)ethane, bis(3-aminopropyl) sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(b-amino-t-butyl)toluene, bis (p-b-amino-t-butylphenyl)ether, bis(p-b-methyl-o-aminophenyl)benzene, bis(p-b-methyl-o-aminopentyl)benzene, 1,3-diamino-4-isopropylbenzene, bis(4-aminophenyl)sulfide, bis(4-aminophenyl)sulfone, bis(4-aminophenyl)ether and 1,3-bis(3-aminopropyl)tetramethyldisiloxane. Mixtures of these compounds may also be present. Beneficial diamino compounds are aromatic diamines, especially m- and p-phenylenediamine and mixtures thereof.

In an exemplary embodiment, the polyetherimide resin includes structural units according to formula (IV) wherein each R is independently p-phenylene or m-phenylene or a mixture thereof and T is a divalent radical of the formula (X)

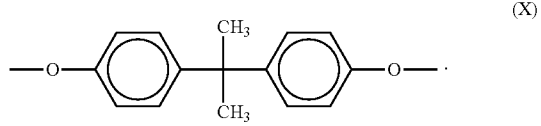

In general, the reactions can be carried out employing solvents such as o-dichlorobenzene, m-cresol/toluene, or the like, to effect a reaction between the anhydride of formula (VII) and the diamine of formula (VIII), at temperatures of about 100° C. to about 250° C. Alternatively, the polyetherimide can be prepared by melt polymerization of aromatic bis(ether anhydride)s of formula (VII) and diamines of formula (VIII) by heating a mixture of the starting materials to elevated temperatures with concurrent stirring. Generally, melt polymerizations employ temperatures of about 200° C. to about 400° C. Chain stoppers and branching agents may also be employed in the reaction. When polyetherimide/polyimide copolymers are employed, a dianhydride, such as pyromellitic anhydride, is used in combination with the bis (ether anhydride). The polyetherimide polymers can optionally be prepared from reaction of an aromatic bis(ether anhydride) with an organic diamine in which the diamine is present in the reaction mixture at no more than about 0.2 molar excess, and beneficially less than about 0.2 molar excess. Under such conditions the polyetherimide resin has less than about 15 microequivalents per gram (µeq/g) acid titratable groups in one embodiment, and less than about 10 µeq/g acid titratable groups in an alternative embodiment, as shown by titration with chloroform solution with a solution of 33 weight percent (wt %) hydrobromic acid in glacial acetic acid. Acid-titratable groups are essentially due to amine endgroups in the polyetherimide resin.

Generally, useful polyetherimides have a melt index of about 0.1 to about 10 grams per minute (g/min), as measured by American Society for Testing Materials (ASTM) D1238 at 295° C., using a 6.6 kilogram (kg) weight. In one embodiment, the polyetherimide resin has a weight average molecular weight (Mw) of about 10,000 to about 150,000 grams per mole (g/mole), as measured by gel permeation chromatography, using a polystyrene standard. Such polyetherimide polymers typically have an intrinsic viscosity greater than about 0.2 deciliters per gram (dl/g), and beneficially about 0.35 to about 0.7 dl/g measured in m-cresol at 25° C.

In one aspect, the thermoplastic polyimide, such as polyetherimide, can be present in an amount of about 0.5%, 1%, 2%, 3%, 4%, 5%, 6%, 7%, 8%, 9% or 10% by weight of the composition. For example, the polyetherimide can be present in an amount of about 2% by weight. In another aspect, the polyetherimide can be present in an amount of about 0.5% to about 10% by weight of the composition. For example, the polyetherimide can be present in an amount of about 0.5% to about 5% by weight of the composition. In another example, the polyetherimide can be present in an amount of about 0.5% to about 4% by weight of the composition.

In one aspect, the polyetherimide can be selected from polyetherimide such as SABIC Ultem 1010 and Ultem 1040 or polyetherimide copolymer such as SABIC Siltem or mixture thereof.

3. Inorganic Filler

In one aspect, the inorganic filler can be present in an amount of about 10%, 15%, 20%, 25%, 30%, 35%, 40%, 45%, 50%, 55% or 60% by weight of the composition. For example, the inorganic filler can be present in about 40% by weight of the composition. In another aspect, the inorganic filler can be present in an amount of about 10% to about 60% by weight of the composition. For example, the inorganic filler can be present in an amount of about 30% to about 50% by weight of the composition.

In one aspect, the inorganic filler can be selected from the group consisting of glass fiber, carbon fiber, glass flake, and ceramic fiber, or a mixture thereof. For example, the inorganic filler can be selected from the group consisting of glass fiber and carbon fiber, or a mixture thereof. For example, the inorganic filler can be glass fiber, such as flat glass fiber.

4. Flame Retardant Additive

The flame retardant additive can be present in an amount of about 5%, 10%, 15%, or 20% by weight of the composition. For example, the flame retardant additive can be present in an amount of about 15% by weight of the composition. In another aspect, the flame retardant additive can be present in less than 10%, 8%, 6%, 4%, 3%, 2%, or 1% but more than 0%. In yet another aspect, the flame retardant additive can be present in an amount of about 10% to about 16% by weight of the composition. For example, the flame retardant additive can be present in an amount of about 12% to about 15% by weight of the composition.

In one aspect, the flame retardant additive can be selected from the group consisting of halogen-free phosphinate, halogen-free disphosphinate, reaction product of melamine with phosphoric acid, and phosphazene compounds, or a mixture thereof. For example, the flame retardant additive can comprise aluminum phosphinate and melamine polyphosphate. The aluminum phosphinate, can for example, be present in an amount of above 0% to about 18% by weight and the melamine polyphosphate can be present in an amount of above 0% to about 8% by weight of the composition. The aluminum phosphinate, can in another example, be present in an amount of about 8% to about 16% by weight and the melamine polyphosphate can be present in an amount of about 0.5% to about 5% by weight of the composition. The aluminum phosphinate, can in another example, be present in an amount of about 10% to about 13% by weight and the melamine polyphosphate can be present in an amount of about 1% to about 6% by weight of the composition. In another example, the flame retardant additive can comprise aluminum phosphinate, melamine polyphosphate and phenoxypolyphosphazene. The aluminum phosphinate, can for example, be present in an amount of above 0% to about 18% by weight and the melamine polyphosphate can be present in an amount of above 0% to about 8% by weight and the phenoxypolyphosphazene can be present in an amount of above 0% to about 6% by weight of the composition. The aluminum phosphinate, can in another example, be present in an amount of about 8% to about 16% by weight and the melamine polyphosphate can be present in an amount of about 0.5% to about 5% and the phenoxypolyphosphazene can be present in an amount of above 0% to about 6% by weight of the composition. The aluminum phosphinate, can in another example, be present in an amount of about 10% to about 13% by weight and the melamine polyphosphate can be present in an amount of about 1% to about 6% and the phenoxypolyphosphazene can be present in an amount of above 0% to about 3% by weight of the composition. Suitable aluminum phosphinates include but are not limited to Exolit OP from Clariant, such as Exolit OP 1230, Exolit OP1240. Other suitable flame retardant additives include, but are not limited to, SPB-100 from Otsuka, FP-110 from Fushimi, Melapur 200/70 from BASF, Budit 3141 from Budenheim, or a mixture thereof.

5. Composition Properties

In one aspect, the composition can have a lower melt viscosity compared to the same composition without the polyetherimide. For example, the composition can have at least 5%, 10% or 15% lower melt viscosity compared to the same composition without the polyetherimide at a specific shear rate.

In one aspect, the composition can have substantially the same or higher tensile strength and flexural strength compared to the same composition without the polyetherimide. For example, the composition can have within 5%, 4%, 3%, 2% or 1% of the tensile strength and flexural strength of the same composition without the polyetherimide.

Suitable raw materials useful to produce the disclosed compounds, compositions and materials include, but are not limited to those listed in Table 1.

TABLE 1

RAW MATERIAL DESCRIPTION

| Item | Raw material | Function | Description |
|---|---|---|---|
| 1 | SABIC Ultem 1040 | Resin | Polyetherimde |
| 2 | SABIC Ultem 1010 | Resin | Polyetherimide |
| 3 | Kurary PA9T | Resin | Polyamide 9T |
| 4 | Solvay AMODEL A1006 | Resin | Polyamide 6-6IT |
| 5 | Solvay AMODEL A 6000 | Resin | Polyamide 6T |
| 6 | Dupont HTN 501 | Resin | Polyamide 6M-T |
| 7 | Nittobo flat glass fiber CSG3PA820 | Filler | Flat glass fiber |
| 8 | Nittobo flat glass fiber CSG3PA830 | Filler | Flat glass fiber |
| 9 | PFG 3540 1/8" (LNP-AP) | Filler | Circuit glass fiber |
| 10 | PPG HP3610 fiber glass | Filler | Circuit glass fiber |
| 11 | NSG Fineflake MEG160FYX coated | Filler | Glass flake |
| 12 | SGL C30S006APS | Filler | Carbon fiber |
| 13 | SPB-100 Otsuka | Flame retardant | Phenoxypolyphosphazene-1 |
| 14 | FP-110 Fushimi | Flame retardant | Phenoxypolyphosphazene-2 |
| 15 | Clariant Exolit OP 1230 | Flame retardant | Aluminum phosphinate |
| 16 | BASF Melapur 200/70 | Flame retardant | Malemine polyphosphate |
| 17 | PHOSPHITE STABILIZER | Additive | Anti-oxidant-1 |
| 18 | Phenolic prim antioxidant for PA | Additive | Anti-oxidant-2 |
| 19 | LONZA ACRAWAX C BEADS | Additive | Releasing agent-1 |
| 20 | Bruggeemann thermal stabilizer H10 | Additive | Anti-oxidant-3 |
| 21 | Bruggeemann thermal stabilizer H161 | Additive | Anti-oxidant-4 |
| 22 | SYNPRO ALUMINUM STEARATE R | Additive | Releasing agent-2 |

C. METHODS

Also disclosed herein are methods for the manufacturer of compositions. In one aspect, the methods can manufacturer the compositions described elsewhere herein.

In one aspect, the methods comprise providing the materials described herein. The methods can be carried out in an extruder, such as a twin screw extruder, such as a Toshiba SE 37 mm twin screw extruder with 1500 mm barrel size. In one aspect, the polyamide and polyetherimide and optionally the flame retardant additive can be added to the feed throat of the extruder. The inorganic filler can be added at a later stage of the process or downstream from the feed throat. In one aspect, the polyamide and polyetherimide and optionally the flame retardant additive can be pre blended by suitable means, such as through a super-blender.

D. ARTICLES OF MANUFACTURE

Also disclosed herein is a device comprising the compositions described herein. Suitable devices include, but are not limited to, computers, such as laptops or notebooks.

E. EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

1. Example 1

Compounding and Evaluation of Molding Process a. Materials and Method

Compounding and evaluation sample molding process. The compounding was processed on a twin screw extruder with a cylinder temperature of 280 to 340° C., The glass fibers, carbon fiber, glass flakes, etc. were fed from downstream. Other components were fed from main throat from upper stream. Additives were pre-blended with base resin by super-blender and then fed. The specimen for physical property and flammability testing were obtained through injection molding.

b. Evaluation: Mechanical Performance, Processability and Performance

Most of the trials of the materials described herein are formulated with more than 30% (wt) fillers. The compounding process is based on best practice of art. For example, the compounding process should be carried out with twin screws extruder. There should be reliable vacuum and also atmosphere vent at the side-feeding zone.

The composite were all compound from twin screws extruder, and the pellets were collected for evaluation and molding. The composite flow was valued by MVR and melt viscosity and the ASTM standard molding parts were evaluated accordingly to the standards for flexural, tensile, and notched Izod impact. Flammability testing was done according to UL-94 (20 mm Vertical Burning Test) using 0.4 mm, 0.8 mm or 1.0 mm thick test pieces, which are then conditioned for either normal condition (48 hours at 23° C. and 50% relative humidity) or aging condition (169 hours at 70° C.).

c. Results

Table 2 shows the results for filled PPA with PEI loading from 0%-30%.

TABLE 2

| Item Description | Unit | 1# | 2# | 3# | 4# | 5# | 6# | 7# |
|---|---|---|---|---|---|---|---|---|
| Main Throat | | | | | | | | |
| Polyamide 6-6IT (Solvay Amolde A1006) | % | 59.45 | 54.45 | 51.95 | 49.45 | 44.45 | 39.45 | 29.45 |
| Anti-oxidant-1 | % | 0.15 | 0.15 | 0.15 | 0.15 | 0.15 | 0.15 | 0.15 |
| Anti-oxidant-2 | % | 0.2 | 0.2 | 0.2 | 0.2 | 0.2 | 0.2 | 0.2 |
| Releasing agent-1 | % | 0.2 | 0.2 | 0.2 | 0.2 | 0.2 | 0.2 | 0.2 |
| Polyetherimide (SABIC Ultem 1040) | % | | 5 | 7.5 | 10 | 15 | 20 | 30 |
| Nittobo flat glass fiber CSG 3PA 830 | % | 40 | 40 | 40 | 40 | 40 | 40 | 40 |

Table 3 shows the typical properties of 40% flat glass fiber filled PPA with different PEI loading.

TABLE 3

| Sample # | Polyetherimide loading | Flexural Modulus, MPa | Tensile Modulus, MPa | Notch Impact Strength, J/m | Flexural Strength, MPa | MVR, cm$^3$/10 min | Tensile Strength, MPa | HDT, ° C. |
|---|---|---|---|---|---|---|---|---|
| 1# | 0% | 11000 | 13765 | 109 | 285 | 33.8 | 195.6 | 277 |
| 2# | 5% | 11000 | 13789 | 115 | 295 | 45 | 194 | 264 |
| 3# | 7.5% | 11400 | 13803 | 123 | 298 | 73.3 | 199.2 | 261 |
| 4# | 10% | 11600 | 13837 | 127 | 295 | 53.7 | 189.2 | 255 |
| 5# | 15% | 11700 | 13934 | 127 | 295 | 58.9 | 194.4 | 250 |
| 6# | 20% | 12100 | 13992 | 115 | 284 | 60.6 | 186 | 240 |
| 7# | 30% | 11600 | 14199 | 87 | 264 | 59.9 | 186.4 | 200 |

Typical properties of 40% flat glass fiber filled PPA with different PEI loading were shown in Table 3. The data indicates that: 1) PEI does not have any negative impact on modulus, both tensile & flexural modulus of the composites increase slightly with the increase of PEI percentage; all the samples are at the same modulus level; 2) PEI is effective to increase the flow ability of glass fiber filled PPA composites. With PEI loading below 7.5%, MVR increase sharply with increasing PEI %, and when PEI % goes up to above 10%, the MVR seems to be maintained at a certain level, which is still 50% higher than the sample without PEI; 3) When PEI loading is <15%, the impact strength of the composites also increases with the increase of PEI loading; and when PEI loading goes up to above 20%, impact strength shows some declining trends. Similar correlation of flexural strength vs. PEI loading was found; 4) No significant influence of PEI on the tensile strength was found; and 5) The HDT drop with the increase of PEI loading, and became to a same level as glass fiber filled PEI composites when PEI percentage goes to 30% (PPA/PEI ratio at 1/1).

As a summary, PEI is effective to improve the flow ability of glass fiber filled PPA composites even though it is an amorphous polymer with higher processing temperature and much higher melting viscosity compared to PPA. These properties stems from the interaction between PEI and PPA.

The melting viscosity of the composites at different shear rate is shown in FIG. 1.

Figure 3:
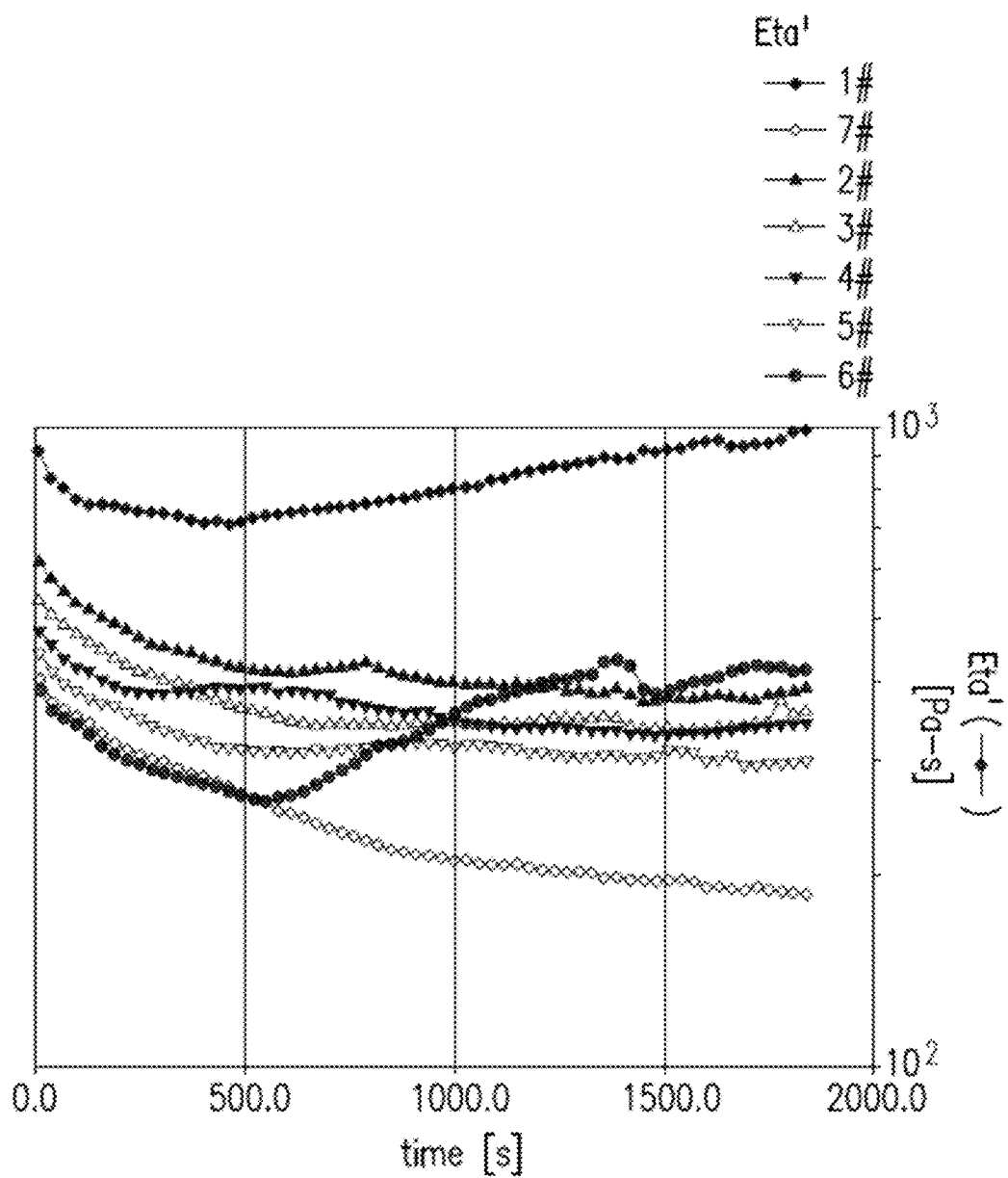
FIG. 3 shows the rheology curve of 40% glass fiber filled PPA with PEI loading from 0-40%.
Figures 4A, 4B, 4C, 4D, 4E, 4F:
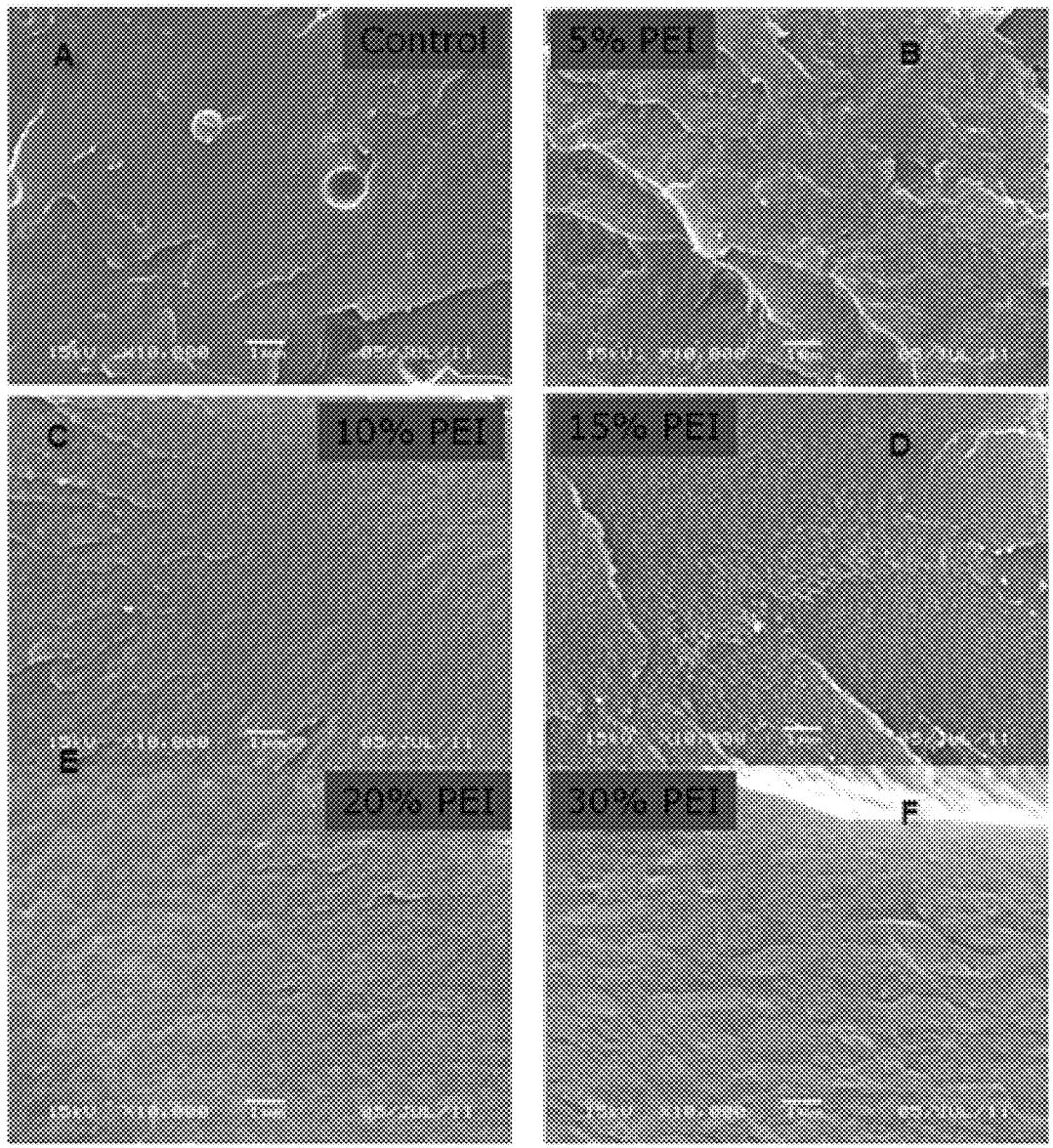
FIG. 4A-F shows SEM picture for 40% glass fiber filled PPA with different PEI loadings.

FIG. 3 shows the influence of PEI on the rheology behavior of 40% glass fiber filled PPA. And it's found that when PEI % is below 20%, the viscosity of the composite drop slightly with time; and it became unstable when PEI % goes to above 20%.

From the SEM pictures in FIG. 4A-F it is observed that when PEI loading is <20%, it is well dispersed in the continuous PPA base resin in a nanometer scale. When PEI loading increases to 20% or higher, the morphology of the composite changes to a bi-continuous phase separation.

Table 4 shows the typical properties of carbon fiber filled PPA with PEI loading from 0% to 20%.

TABLE 4

| Item description | Unit | 1# | 2# | 3# | 4# | 5# | 6# | 7# |
|---|---|---|---|---|---|---|---|---|
| | | | | Main throat | | | | |
| Polyamide 6-6IT (Amodel A1006) | % | 69.45 | 64.45 | 61.95 | 59.45 | 54.45 | 49.45 | |
| Anti-oxidant-1 | % | 0.15 | 0.15 | 0.15 | 0.15 | 0.15 | 0.15 | |
| Anti-oxidant-2 | % | 0.2 | 0.2 | 0.2 | 0.2 | 0.2 | 0.2 | |
| Releasing agent-1 | % | 0.2 | 0.2 | 0.2 | 0.2 | 0.2 | 0.2 | 0.2 |
| Polyetherimide (SABIC Ultem 1040) | % | | 5 | 7.5 | 10 | 15 | 20 | 69.8 |
| Chopped carbon fiber | % | 30 | 30 | 30 | 30 | 30 | 30 | 30 |

| Typical properties | Test method | Unit | 1# | 2# | 3# | 4# | 5# | 6# | |
|---|---|---|---|---|---|---|---|---|---|
| Melt Viscosity @ 340° C. | ISO11443 | | App. Visc. | App. Visc. | App. Visc. | App. Visc. | App. Visc. | App. Visc. | / |
| 100.01 s$^{-1}$ | | Pa·s | 380.18 | 263.03 | 182.36 | 229.88 | 238.72 | 182.36 | / |
| 200 s$^{-1}$ | | Pa·s | 289.02 | 197.84 | 150.31 | 167.45 | 182.37 | 139.26 | / |
| 500 s$^{-1}$ | | Pa·s | 196.73 | 141.47 | 109.64 | 118.04 | 128.87 | 99.25 | / |
| 1000.01 s$^{-1}$ | | Pa·s | 144.96 | 107.65 | 87.65 | 91.62 | 93.72 | 81.12 | / |
| 1500 s$^{-1}$ | | Pa·s | 121.22 | 89.83 | 75.46 | 78.42 | 78.72 | 69.63 | / |
| 3000 s$^{-1}$ | | Pa·s | 86.57 | 66.57 | 57.35 | 57.94 | 58.65 | 53.35 | / |
| 5000 s$^{-1}$ | | Pa·s | 67.13 | 52.3 | 50.39 | 46.25 | 46.67 | 43.3 | / |
| 10000 s$^{-1}$ | | Pa·s | 45.85 | 37.11 | X | 32.79 | 33.92 | 31.1 | / |
| Notched IZOD Impact Strength, | ASTM D 256 | J/m | 66.1 | 61.9 | 60 | 60 | 58.8 | 53.8 | 39.4 |
| Specific Gravity | ASTM D 792 | / | 1.32 | 1.32 | 1.32 | 1.33 | 1.33 | 1.33 | 1.39 |
| Flexural Modulus | ASTM D 790 | MPa | 18400 | 17800 | 18800 | 17800 | 18500 | 17400 | 14600 |
| Flexural Strength @ Y | ASTM D 790 | MPa | 414 | 394 | 388 | 396 | 380 | 374 | 218 |
| Flexural Strength @ B | ASTM D 790 | MPa | 411 | 391 | 384 | 392 | 377 | 371 | 216 |
| Tensile Modulus | ASTM D 638 | MPa | 23803.6 | 23853 | 24124.4 | 24224.8 | 23807 | 23076.6 | 21142.2 |
| Tensile Strength @ B | ASTM D 638 | MPa | 275 | 276.4 | 257 | 268 | 257.2 | 254.6 | 213.8 |
| Tensile Elongation | ASTM D 638 | % | 2.4 | 2.4 | 1.7 | 2.3 | 2.1 | 2.2 | 1.9 |
| HDT | ASTM D 648 | °C. | 285 | 276 | 269 | 269 | 264 | 257 | |
| MVR @ 340° C./ 5 Kg | ASTM D 1238 | cm³/10 min | 18.3 | 28.5 | 33.3 | 36.3 | 40.5 | 49.8 | 75.8@ 360 C./ 10 Kg |

Table 4 indicates that PEI can significantly increase the flow of carbon fiber filled PPA composites, with no big drop in the other mechanical properties. Similar results were also found in glass fiber and glass flake hybrid filler system, as shown in Table 5.

TABLE 5

| Item description | Unit | 1# | 2# | 3# | 4# | 5# | 6# | 7# |
|---|---|---|---|---|---|---|---|---|
| | | | | Main throat | | | | |
| Polyamide 6-6IT (Amodel A1006) | % | 59.45 | 54.45 | 51.95 | 49.45 | 44.45 | 39.45 | 29.45 |
| Anti-oxidant-1 | % | 0.15 | 0.15 | 0.15 | 0.15 | 0.15 | 0.15 | 0.15 |
| Anti-oxidant-2 | % | 0.2 | 0.2 | 0.2 | 0.2 | 0.2 | 0.2 | 0.2 |
| Releasing agent-1 | % | 0.2 | 0.2 | 0.2 | 0.2 | 0.2 | 0.2 | 0.2 |
| Polyetherimide (SABIC Ultem 1040) | % | | 5 | 7.5 | 10 | 15 | 20 | 30 |

TABLE 5-continued

| | | | 1# | 2# | 3# | 4# | 5# | 6# | 7# |
|---|---|---|---|---|---|---|---|---|---|
| PFG 3540 | | % | 30 | 30 | 30 | 30 | 30 | 30 | 30 |
| glass flake | | % | 10 | 10 | 10 | 10 | 10 | 10 | 10 |

| Typical properties | Test method | Unit | 1# | 2# | 3# | 4# | 5# | 6# | 7# |
|---|---|---|---|---|---|---|---|---|---|
| Melt Viscosity @ 340° C. | ISO11443 | | App. Visc | App. Visc | App. Visc | App. Visc | App. Visc | App. Visc | App. Visc |
| | 100.01 s$^{-1}$ | Pa·s | 371.34 | 301.72 | 310.56 | 299.51 | 288.45 | 289.56 | 303.93 |
| | 200 s$^{-1}$ | Pa·s | 270.79 | 208.34 | 216.63 | 204.47 | 208.89 | 204.47 | 213.31 |
| | 500 s$^{-1}$ | Pa·s | 181.92 | 135.28 | 139.7 | 129.98 | 135.28 | 136.17 | 142.58 |
| | 1000.01 s$^{-1}$ | Pa·s | 128.3 | 99.8 | 103.56 | 93.95 | 103.45 | 103.89 | 110.08 |
| | 1500 s$^{-1}$ | Pa·s | 104.34 | 81.75 | 86.42 | 78.64 | 85.46 | 85.6 | 91.38 |
| | 3000 s$^{-1}$ | Pa·s | 73.76 | 59.24 | 62.35 | 57.35 | 61.61 | 62.17 | 67.5 |
| | 5000 s$^{-1}$ | Pa·s | 56 | 44.99 | 47.41 | 43.54 | 48.19 | 48.14 | 53.87 |
| | 10000 s$^{-1}$ | Pa·s | 41.66 | 34.58 | 34.46 | 30.92 | 34.47 | 35.47 | 38.06 |
| Notched IZOD Impact Strength | ASTM D 256 | J/m | 79.5 | 83 | 77.5 | 81.5 | 80 | 64.5 | 60.6 |
| Specific Gravity | ASTM D 792 | / | 1.519 | 1.525 | 1.529 | 1.532 | 1.537 | 1.545 | 1.560 |
| Flexural Modulus | ASTM D 790 | MPa | 11700 | 11800 | 11900 | 11800 | 11700 | 10000 | 10400 |
| Flexural Strength @ Yield | ASTM D 790 | MPa | 316 | 318 | 308 | 303 | 296 | 282 | 230 |
| Flexural Strength @ Break | ASTM D 790 | MPa | 315 | 316 | 307 | 301 | 294 | 279 | 227 |
| Tensile Modulus | ASTM D 638 | MPa | 13170.2 | 13241.4 | 13363.4 | 13375.8 | 13398.8 | 13525.4 | 13682.6 |
| Tensile Strength @ Break | ASTM D 638 | MPa | 198.6 | 194.6 | 188.6 | 185.6 | 181.6 | 187.4 | 184 |
| Tensile Elongation | ASTM D 638 | % | 2.4 | 2.3 | 2.3 | 2.2 | 2.2 | 2.2 | 2.2 |
| HDT | ASTM D 648 | ° C. | 275 | 263 | 259 | 258 | 244 | 210 | 193 |
| MVR @ 340° C./5 Kg | ASTM D 1238 | cm³/10 min | 46.2 | 49.3 | 51.4 | 49.8 | 60.9 | 65.3 | 69.5 |

Table 6 shows that with 5-8% PEI, the flame retardant additive (Exolit OP1230) loading can be dropped from 18% to 15%, while still achieve robust V0 with 0.8-1.0 mm thickness. Some examples of 50% glass fiber system are shown in Table 7.

TABLE 6

| Item Description | | Unit | 1# | 2# | 3# |
|---|---|---|---|---|---|
| Polyamide 6M-T (ZYTEL HTN 501) | | % | 30.72 | 29.52 | 27.72 |
| Polyamide 6T (Amodel A6000) | | % | 20.48 | 19.68 | 18.48 |
| Polyetherimide (SABUC Ultem 1040) | | % | 5 | 8 | |
| Releasing agent-2 | | % | 0.2 | 0.2 | 0.2 |
| Aluminum phosphinate | | % | 18 | 15 | 15 |
| Anti-oxidant-3 | | % | 0.3 | 0.3 | 0.3 |
| Anti-oxidant-4 | | % | 0.3 | 0.3 | 0.3 |
| Circuit glass fiber | | % | 30 | 30 | 30 |

| Typical Properties | Test Description | Unit | 3# | 4# | 5# |
|---|---|---|---|---|---|
| Notched IZOD Impact Strength | ASTM D256 | J/m | 89.7 | 89.4 | 91.8 |
| Flexural Modulus | ASTM D 790 | MPa | 10600 | 9980 | 10800 |
| Flexural Strength at Yield | ASTM D 791 | MPa | 264 | 250 | 249 |
| Flexural Strength at Break | ASTM D 794 | MPa | 262 | 249 | 247 |
| HDT | ASTM D 648, 3.2 mm@1.82 MPa | ° C. | 262 | 251 | 247 |
| Tensile Modulus | ASTM D 638, 5 mm/min | MPa | 12110 | 11515.8 | 12033.6 |

TABLE 6-continued

| | | | | | |
|---|---|---|---|---|---|
| Tensile Strength@Break | ASTM D 638, 5 mm/min | MPa | 173.8 | 164.6 | 168.4 |
| Tensile Elongation@Break | ASTM D 638, 5 mm/min | % | 2.9 | 2.8 | 2.7 |
| Specific Gravity | ASTM D 792 | — | 1.44 | 1.44 | 1.45 |
| Impact Strength | ASTM D4812, unnotched IZOD | J/m | 937 | 879 | 845 |
| MVR | ASTM D1238, 330° C./1.2 Kg | cm$^3$/10 min | 2.83 | 13.7 | 13 |
| MVR | ASTM D1238, 330° C./2.16 Kg | cm$^3$/10 min | 11 | 30.9 | 31.7 |
| flammability | UL 94, V0 @0.8 mm | | Pass | Pass | Pass |
| Flammability | UL 94, V0 @1.0 mm | | Pass | Pass | Pass |
| Melt Viscosity | Shear rate | | Melt Viscosity, ISO11443 at 320° C. | | |
| | 1000.07 s$^{-1}$ | Pa · s | 181.68 | 131.7 | 128.23 |
| | 1500.1 s$^{-1}$ | Pa · s | 145.34 | 113.97 | 108.66 |
| | 3000.08$^{s-1}$ | Pa · s | 107.86 | 85.47 | 82.93 |
| | 5000.09 s$^{-1}$ | Pa · s | 83.5 | 67.64 | 67.07 |

TABLE 7

| Item Description | | Unit | −1# | 2# | 3# | 4# |
|---|---|---|---|---|---|---|
| Polyamide 6M-T (Zytel HTN 501) | | % | 18.82 | 20.63 | 18.82 | 17.62 |
| Polyamide 6T (Amodel A6000) | | % | 12.38 | 13.57 | 12.38 | 11.58 |
| Polyetherimide (SABIC Ultem 1040) | | % | | | 3 | 5 |
| Releasing agent-2 | | % | 0.2 | 0.2 | 0.2 | 0.2 |
| Aluminum phosphinate | | % | 18 | 15 | 15 | 15 |
| Anti-oxidant-3 | | % | 0.3 | 0.3 | 0.3 | 0.3 |
| Anti-oxidant-4 | | % | 0.3 | 0.3 | 0.3 | 0.3 |
| Flat glass fiber | | % | 50 | 50 | 50 | 50 |
| Typical Properties | Test Description | Unit | 1# | 2# | 3# | 4# |
| Notched IZOD Impact Strength | ASTM D256 | J/m | 80.1 | 90.1 | 82.1 | 103.5 |
| Flexural Modulus | ASTM D 790 | MPa | 16700 | 15800 | 16900 | 17500 |
| Flexural Strength at Yield | ASTM D 791 | MPa | 244 | 251 | 253 | 250 |
| Flexural Strength at Break | ASTM D 794 | MPa | 243 | 251 | 249 | 245 |
| HDT | ASTM D 648, 3.2 mm@1.82 MPa | ° C. | 258 | 259 | 250 | 244 |
| Tensile Modulus | ASTM D 638, 5 mm/min | MPa | 18849 | 18547.2 | 18617.2 | 18891 |
| Tensile Strength@Break | ASTM D 638, 5 mm/min | MPa | 171 | 184.2 | 164.8 | 172.6 |
| Tensile Elongation@Break | ASTM D 638, 5 mm/min | % | 2 | 2.2 | 1.8 | 1.8 |
| Specific Gravity | ASTM D 792 | — | 1.6688 | 1.6577 | 1.6642 | 1.6682 |
| Unnotched IZOD Impact Strength | ASTM D4812 | J/m | 335 | 441 | 361 | 450 |
| MVR | ASTM D1238, 330° C./2.16 Kg | cm$^3$/10 min | 3.31 | 7.18 | 10.9 | 16.2 |
| Flammability | UL 94, V0@0.8 mm | | fail | fail | Pass | Pass |
| Flammability | UL 94, V0 @ 1.0 mm | | Pass | fail | Pass | Pass |
| Melt Viscosity | Shear rate | | Melt Viscosity, ISO11443 at 320° C. | | | |
| | 1000.01 | Pa · s | 200.06 | 191.35 | 161.11 | 149.08 |
| | 1500 | Pa · s | 166.66 | 160.47 | 126.59 | 128.38 |
| | 3000 | Pa · s | 123.73 | 115.32 | 98.55 | 98.11 |
| | 5000 | Pa · s | 94.73 | 89.11 | 76.06 | 77.23 |

In Table 7, PEI was added into 50% flat glass fiber reinforced PPA and again it is confirmed that PEI could help to reduce the viscosity of high filler filled PPA composites, and also benefits in robust flame retardancy without big drop mechanical properties.

Figures 5A, 5B, 5C, 5D, 5E:
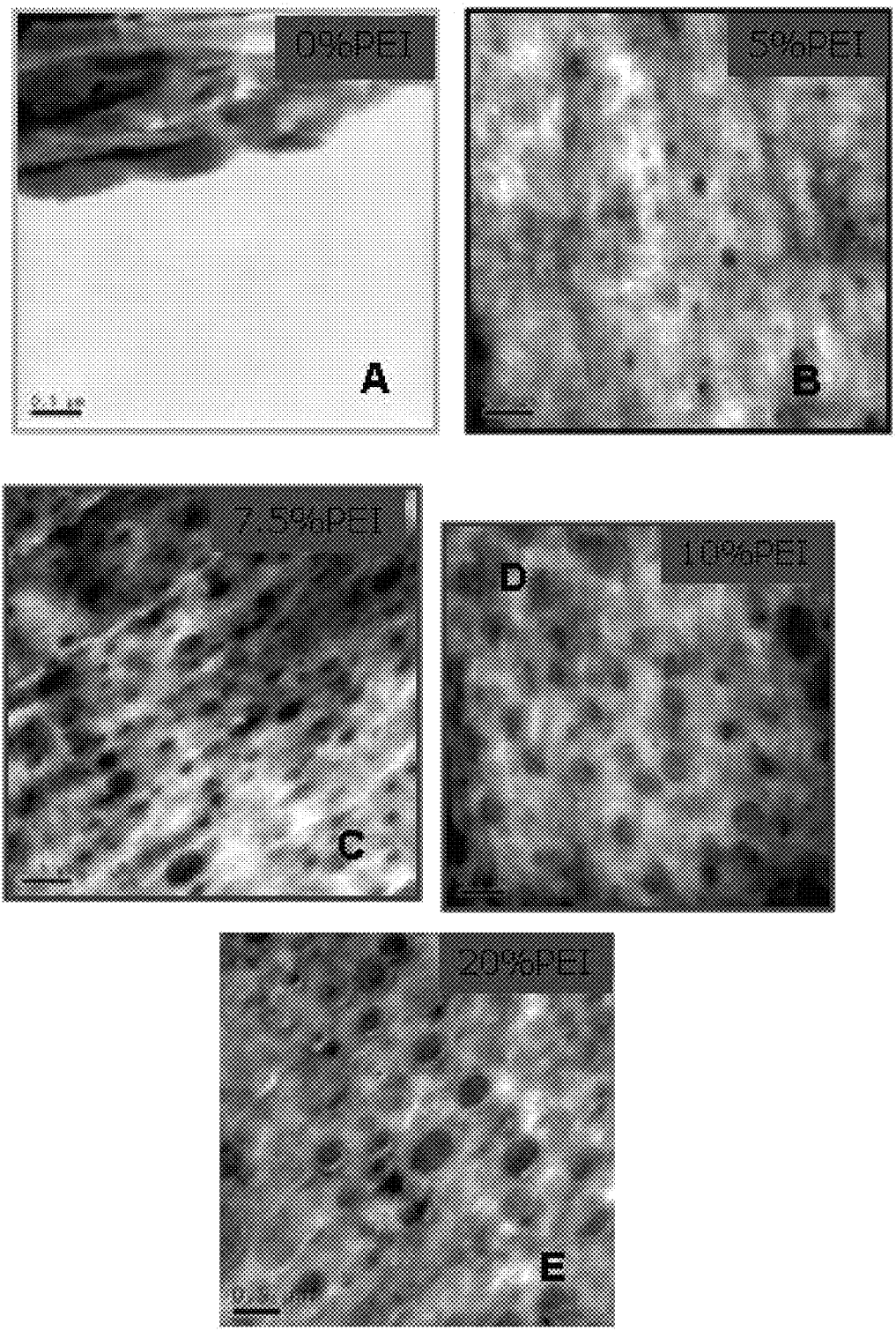
FIG. 5A-E shows the morphology of PPA/PEI blends filled with 30% carbon fiber.

FIG. 5 shows the transmission electrical microscope (TEM) photo of PPA/PEI blends with 30% filled carbon fiber. We can see that in the composites of 30% carbon fiber filled PPA/PEI blends, PEI is well dispersed in PPA continuous phase, and the particles size is around several hundred nanometers. PEI particles size became larger when PEI loading goes higher. Good dispersion plus that PEI itself has very good flame retardancy, this might give some explanation on why PEI can give robust flame retardancy and is promising to significantly lower the regular flame retardant additives.

Table 8 shows flame retardant PA9T composites with 50% glass fiber and with different PEI loading.

TABLE 8

| Item Description | Unit | 1# | 2# | 3# | 4# | 5# |
|---|---|---|---|---|---|---|
| Polyamide 9T | % | 43.2 | 28.2 | 23.2 | 32.2 | 29.2 |
| Polyetherimide (SABIC Ultem 1040) | % | 0 | 5 | 10 | 5 | 8 |
| Releasing agent-2 | % | 0.2 | 0.2 | 0.2 | 0.2 | 0.2 |
| Aluminum phosphinate | % | 16 | 16 | 16 | 12 | 12 |
| Anti-oxidant-3 | % | 0.3 | 0.3 | 0.3 | 0.3 | 0.3 |
| Anti-oxidant-4 | % | 0.3 | 0.3 | 0.3 | 0.3 | 0.3 |
| Flat glass fiber | % | 40 | 50 | 50 | 50 | 50 |

| Typical Properties | Test Description | Unit | 1# | 2# | 1# | 2# |
|---|---|---|---|---|---|---|
| Notched IZOD Impact Strength | ASTM D256 | J/m | 103 | 61.9 | 58.5 | / | 73.4 |
| Flexural Modulus | ASTM D 790 | MPa | 11900 | 15500 | 15600 | / | 13800 |
| Flexural Strength at Yield | ASTM D 791 | MPa | 234 | 219 | 194 | / | 176 |
| Flexural Strength at Break | ASTM D 794 | MPa | 232 | 219 | 194 | / | 175 |
| HDT | ASTM D 648, 3.2 mm@ 1.82 MPa | °C. | 280 | 266 | 259 | / | 259 |
| Tensile Modulus | ASTM D 638, 5 mm/min | MPa | 13700 | 17616.8 | 18605.8 | / | 17536.2 |
| Tensile Strength@ Break | ASTM D 638, 5 mm/min | MPa | 145 | 142 | 135 | / | 143 |
| Tensile Elongation @Break | ASTM D 638, 5 mm/min | % | 1.9 | 1.5 | 1.4 | / | 1.5 |
| Specific Gravity | ASTM D 792 | — | 1.5053 | 1.6463 | 1.6808 | / | 1.6577 |
| Unnotched IZOD Impact Strength | ASTM D4812 | J/m | 704 | 265 | 195 | / | 243 |
| MVR | ASTM D1238, 330° C./5 Kg | cm³/10 min | / | / | / | 91.1 | 108.5 |
| MVR | ASTM D1238, 310° C./5 Kg | cm³/10 min | / | 43.9 | 50.7 | / | / |
| UL rating | 0.8 mm-normal | | / | / | / | V-not | V1 |
| UL rating | 1.0 mm-normal | | V-not | V0 | V0 | V-not | V1 |

In Table 8, 40-50% flat glass fiber reinforced PA9T/PEI blends is produced. Because of the long aliphatic chain in its monomer, 16% OP1230 loading cannot give 40% glass fiber reinforced PA9T V0 or V1 UL listing as shown in Table 10. When 5% PEI was added to 50% glass fiber reinforced PA9T with 16% OP1230, the obtained composite can reach robust V0 rating, which indicated PEI greatly contributed to the flame retardant performance of high filler loading PA9T composite. When PEI loading increased to 10%, the MVR of the composite increased by about 20% percent compared to 5% PEI loading. Hence, it is confirmed that PEI could help to reduce the viscosity of PA9T composites, and also benefits in robust flame retardancy. When OP1230 loading decrease to 12% as shown in the right two columns in Table 8, increasing PEI loading from 5% to 8% also show obvious contribution to improve flame retardant performance to robust V1 rating.

Table 9 shows flame retardant PPA composites with 50% glass fiber and with PEI and without PEI.

TABLE 9

| Item Description | Unit | 1# | 2# | 3# | 4# |
|---|---|---|---|---|---|
| Polyamide 9T | % | 29.2 | 25.2 | 25.2 | 28.2 |
| Polyetherimide (SABIC Ultem 1040) | % | 8 | 8 | 8 | 8 |
| Releasing agent-2 | % | 0.2 | 0.2 | 0.2 | 0.2 |
| Aluminum phosphinate | % | 12 | 12 | 12 | 10 |
| Melamine Polyphosphate | % | 0 | 1 | 2 | 3 |

TABLE 9-continued

| | | | | | | |
|---|---|---|---|---|---|---|
| Phenoxypolyphosphazene | | % | 0 | 3 | 2 | 0 |
| Anti-oxidant-3 | | % | 0.3 | 0.3 | 0.3 | 0.3 |
| Anti-oxidant-4 | | % | 0.3 | 0.3 | 0.3 | 0.3 |
| Flat glass fiber | | % | 50 | 50 | 50 | 50 |
| Typical Properties | Test Description | Unit | | | | |
| Notched IZOD Impact Strength | ASTM D256 | J/m | 112 | 105 | 107 | 102 |
| Flexural Modulus | ASTM D 790 | MPa | 18700 | 15700 | 17000 | 16100 |
| Flexural Strength at Break | ASTM D 794 | MPa | 245 | 236 | 228 | 246 |
| Tensile Modulus | ASTM D 638, 5 mm/min | MPa | 19733 | 17333 | 19170 | 18427 |
| Tensile Strength@Break | ASTM D 638, 5 mm/min | MPa | 153.4 | 161.2 | 150 | 150.4 |
| Tensile Elongation@Break | ASTM D 638, 5 mm/min | % | 1.5 | 1.8 | 1.5 | 1.5 |
| Specific Gravity | ASTM D 792 | — | 1.7194 | 1.6656 | 1.6903 | 1.6506 |
| Unnotched IZOD Impact Strength | ASTM D4812 | J/m | 441 | 411 | 298 | 448 |
| UL rating | 0.8 mm-normal | | V-not | V-not | V0 | V0 |
| UL rating | V0, 1.0 mm-normal | | V1 | V0 | V0 | V0 |

In Table 9, melamine polyphosphate (MPP,) and phenoxypolyphosphazene ( ) were introduced to 50% glass fiber reinforced PA9T as flame retardant synergists. It shows that MPP can further improve the flame retardant with the presence of PEI, while phenoxypolyphosphazene has less flame retardant synergic but also will have less mechanical property dropping effect. Under 12% OP1230 and 8% PEI loading, the obtained PA9T composite can only reach V1 UL rating, when adding 1% MPP and 3% phenoxypolyphosphazene, the obtained composite can reach marginal V0 UL rating, meanwhile maintain well-balanced mechanical property. With 2% MPP and 2% phenoxypolyphosphazene, the obtained article can achieved robust V0 UL rating with a slightly drop in strength and elongation. With 3% MPP loading, the main flame retardant OP1230 loading can be further lowered down to 10% without sacrificing too much mechanical property. Briefly, a flame retardant package comprising PEI, MPP and phenoxypolyphosphazene will work as a very effective solution in high filler loading non-halogen PPA composite.

Table 10 shows flame retardant PPA composites with 50% flat glass fiber and with PEI and without PEI.

TABLE 10

| Item Description | | Unit | 1# | 2# | 3# |
|---|---|---|---|---|---|
| Polyamide 9T | | % | 34.5 | 34.5 | 33.5 |
| Polyetherimide (SABIC Ultem 1040) | | % | 0 | 0 | 2 |
| Releasing agent-2 | | % | 0.2 | 0.2 | 0.2 |
| Aluminum phosphinate | | % | 15 | 13 | 12 |
| Melamine Polyphosphate | | % | 0 | 2 | 2 |
| Anti-oxidant-4 | | % | 0.3 | 0.3 | 0.3 |
| Flat glass fiber | | % | 50 | 50 | 50 |
| Pigment Carbon Black | | % | 0.5 | 0.5 | 0.5 |
| Typical Properties | Test Description | Unit | | | |
| Notched IZOD Impact Strength | ASTM D256 | J/m | 89 | 98.3 | 108 |
| Flexural Modulus | ASTM D 790 | MPa | 16000 | 16500 | 16000 |
| Flexural Strength at Break | ASTM D 794 | MPa | 242 | 262 | 259 |
| Tensile Modulus | ASTM D 638, 5 mm/min | MPa | 18351.5 | 19370.4 | 19744.8 |
| Tensile Strength@Break | ASTM D 638, 5 mm/min | MPa | 150.8 | 166.8 | 163 |
| Tensile Elongation@Break | ASTM D 638, 5 mm/min | % | 1.6 | 1.7 | 1.7 |
| Specific Gravity | ASTM D 792 | — | 1.6570 | 1.6672 | 1.6554 |
| Unnotched IZOD Impact Strength | ASTM D4812 | J/m | 473 | 608 | 608 |
| UL rating | 1.0 mm | | V-not | V0 | V0 |
| UL rating | 0.8 mm | | V-not | V1 | V0 |
| UL rating | 0.4 mm | | V-not | V-not | V0 |

In Table 10, another flat glass fiber Nittobo CSG A820 was introduced to 50% glass fiber filled flame retardant PA9T composite. Aluminum phosphinate was used as main flame retardant while melamine polyphosphate (MPP) and PEI were used as flame retardant synergists. The result shows with Exolit OP1230 loading of 15% (wt), the final composite cannot reach V0 or V1 rating under all thickness tested. However, when the 2% by weight aluminum phosphinate was replaced with MPP, the flame retardant performance was improved. Under 1.0 mm, V0 flame retardancy performance can be achieved, while under 0.8 mm, the flame retardancy performance also reach V1. Also, regarding other mechanical performance, they were slightly improved with the addition of MPP. Therefore, MPP is a good flame retardant synergist in high filled PPA system without scarifying the mechanical performance. More interestingly, when PEI was added in the formulation, the flame retardancy performance can be even better. In the $3^{rd}$ column of Table 11, when 2% by weight PEI was used in the formulation, it was surprising to find the flame retardancy performance can reach robust V0 under both 1.0 mm and 0.8 mm thickness. Even under 0.4 mm thickness, the flame retardancy performance can also achieved V0. Further, no drop of mechanical performance was observed by adding 2% (wt) PEI. By visual observation, it is indicated that the working mechanism of MPP and PEI in increasing the flame retardancy it that during the first ignition, MPP works as flame and heat diluter through its decomposition, while during the second ignition, PEI can work with MPP to form a very strong intumescent layer which effectively prohibits the flame.

What is claimed is:

1. A composition comprising:
   (a) about 30% to about 80% by weight polyamide;
   (b) about 2% to about 15% by weight thermoplastic polyimide; and
   (c) about 30% to about 50% by weight inorganic filler,
       wherein the composition has a melt viscosity that is at least 10% lower as compared to a substantially identical composition but without the thermoplastic polyimide as determined by test method ISO 11443 at the same temperature and at the same shear rate.

2. The composition of claim 1, further comprising above 0% to about 20% by weight of at least one flame retardant additive.

3. The composition of claim 1, wherein the thermoplastic polyimide is a polyetherimide.

4. The composition of claim 1, wherein the thermoplastic polyimide is present in an amount of about 2% to about 10% by weight of the composition.

5. The composition of claim 1, wherein the polyamide is present in an amount of about 40% to about 60% by weight of the composition.

6. The composition of claim 2, wherein the flame retardant additive is present in an amount of about 10% to about 16% by weight of the composition.

7. The composition of claim 2, wherein the flame retardant additive is selected from the group consisting of halogen-free phosphinate, halogen-free disphosphinate, reaction product of melamine with phosphoric acid, phosphazene compounds, and mixtures thereof.

8. The composition of claim 2, wherein the flame retardant additive comprises aluminum phosphinate and melamine polyphosphate.

9. The composition of claim 3, wherein the polyetherimide is selected from the group consisting of polyetherimide homopolymer, copolymer, and mixtures thereof.

10. The composition of claim 1, wherein the inorganic filler is selected from the group consisting of glass fiber, carbon fiber, glass flake, ceramic fiber, and mixtures thereof.

11. The composition of claim 1, wherein the inorganic filler is selected from the group consisting of glass fiber, carbon fiber, and mixtures thereof.

12. The composition of claim 1, wherein the polyamide is polyphthalamide.

13. The composition of claim 1, wherein the polyamide is selected from the group consisting of PA9T, PA6T, PA6I, PA6-6T, PA6-6IT, PA6M-T, and mixtures thereof.

14. A device comprising the composition of claim 1.

15. The device of claim 14, wherein the device is a computer.

16. The composition of claim 1, wherein the composition has a melt viscosity that is at least 20% lower as compared to a substantially identical composition but without the thermoplastic polyimide as determined by test method ISO 11443 at a the same temperature and at the same shear rate.

17. The composition of claim 2, wherein the composition has a flammability rating of V0 as determined by test method UL 94.

18. A new composition comprising:
   (d) about 30% to about 80% by weight polyamide;
   (e) about 2% to about 15% by weight thermoplastic polyimide; and
   (f) about 30% to about 50% by weight inorganic filler,
       wherein the composition has a notched IZOD impact strength that is at least 100% of the notched IZOD impact strength of a substantially identical composition but without the thermoplastic polyimide as determined by test method ASTM D256.

19. A composition comprising:
   (g) about 30% to about 80% by weight polyamide;
   (h) about 2% to about 15% by weight thermoplastic polyimide; and
   (i) about 30% to about 50% by weight inorganic filler,
       wherein the composition has a notched IZOD impact strength that is at least 90% of the notched IZOD impact strength of a substantially identical composition but without the thermoplastic polyimide as determined by test method ASTM D256 and wherein the composition has a melt viscosity that is at least 10% lower as compared to a substantially identical composition but without the thermoplastic polyimide as determined by test method ISO 11443 at same temperature and at the same shear rate.

* * * * *